United States Patent
Waterhouse et al.

(10) Patent No.: US 7,436,304 B1
(45) Date of Patent: Oct. 14, 2008

(54) EVIDENCE TRACKING

(75) Inventors: Paul Waterhouse, Selkirk (CA); John K Stevens, Stratham, NH (US); Jason August, Toronto (CA); Jessica L Olson, Erie, CO (US)

(73) Assignee: Visible Assets, Inc, Mississauga, Ontario (CA)

( * ) Notice: Subject to any disclaimer, the term of this patent is extended or adjusted under 35 U.S.C. 154(b) by 222 days.

(21) Appl. No.: 11/456,182

(22) Filed: Jul. 7, 2006

Related U.S. Application Data

(60) Provisional application No. 60/700,886, filed on Jul. 19, 2005, provisional application No. 60/806,748, filed on Jul. 7, 2006.

(51) Int. Cl.
*G08B 13/14* (2006.01)

(52) U.S. Cl. .............. 340/572.1; 340/539.13; 340/573.1; 340/10.1

(58) Field of Classification Search .......... 340/572.1, 340/572.7, 573.1, 539.13, 10.1, 10.2; 235/375, 235/385
See application file for complete search history.

(56) References Cited

U.S. PATENT DOCUMENTS

| | | | |
|---|---|---|---|
| 5,371,982 A * | 12/1994 | Douglas et al. ............ 52/64 |
| 5,781,704 A * | 7/1998 | Rossmo ................... 706/45 |
| 6,538,623 B1 * | 3/2003 | Parnian et al. ............ 345/8 |
| 6,750,769 B1 * | 6/2004 | Smith .................. 340/572.1 |
| 6,772,532 B1 * | 8/2004 | Honea .................... 33/759 |
| 6,816,075 B2 * | 11/2004 | Grunes et al. .......... 340/572.1 |
| 6,935,059 B1 * | 8/2005 | Chang .................. 40/607.02 |
| 6,992,582 B2 * | 1/2006 | Hill et al. .............. 340/539.13 |
| 7,013,619 B2 * | 3/2006 | Hoover ................... 53/427 |
| 2005/0012619 A1 * | 1/2005 | Sato ................... 340/572.8 |
| 2006/0130598 A1 * | 6/2006 | Driessche ............... 73/864.71 |
| 2007/0085681 A1 * | 4/2007 | Sawyer .................. 340/572.1 |

\* cited by examiner

*Primary Examiner*—George A Bugg
*Assistant Examiner*—Eric M Blount
(74) *Attorney, Agent, or Firm*—Marina Larson & Associates, LLC

(57) ABSTRACT

A system uses a large loop antenna, connected with a transceiver operating below 1 MHz. The loop antenna is deployed from a spool to surround a crime scene, and may carry indicia communicating that it is a crime scene boundary. The system interrogates devices, including evidence bags and badged personnel, as they enter and leave the scene. The system can optionally log the time of salient events. A second loop antenna can log evidence bags as they enter a vehicle. The devices can be silenced by the transceiver and thus collisions can be reduced and avoided among responses from devices. The system performs "area reads" that would not be possible if higher RF frequencies were employed.

11 Claims, 1 Drawing Sheet

EVIDENCE TRACKING

CROSS-REFERENCE TO RELATED APPLICATIONS

This application claims priority from U.S. application No. 60/700,886 filed Jul. 19, 2005, and from U.S. application No. 60/806,748 filed Jul. 7, 2006, each of which is incorporated herein by reference for all purposes.

BACKGROUND

It is not easy to keep track of evidence in a crime scene investigation. It is necessary for each piece of evidence to maintain a "chain of custody" so that the authenticity of a piece of evidence at trial can be known. At many crime scenes it is also necessary to maintain a log of the personnel entering and leaving the crime scene. The procedures required to maintain the chain of custody and the crime scene log are detail-oriented and if errors are made it can be a big problem later.

It has been proposed to use RFID tags, for example, to try to keep track of evidence and to assist in logging entry and exit of personnel from areas. Most RFID tag designs are not very workable for these purposes, as they are little more than high-tech bar codes that can only be read by a reader such as a handheld "gun" that is placed into close physical proximity with a tag to read the tag. At most crime scenes it is unworkable to try to use close-proximity readers, whether bar-code or RFID. One cannot, for example, count on a person who is entering or exiting a crime scene to do so at a location where such a close-proximity reader is located. Through inadvertence or otherwise, an evidence bag might enter or exit a crime scene boundary at any point along the boundary.

It would be very desirable if a system and method could be devised that would facilitate RF tracking of salient events at a crime scene, that would detect entry and exit at all points along a boundary, and that would more or less continually keep track of who is in the crime scene.

SUMMARY OF THE INVENTION

A system uses a large loop antenna, connected with a transceiver operating below 1 MHz. The loop antenna is deployed from a spool to surround a crime scene, and may carry indicia communicating that it is a crime scene boundary. The system interrogates devices, including evidence bags and badged personnel, as they enter and leave the scene. The system can optionally log the time of salient events. A second loop antenna can log evidence bags as they enter a vehicle. The devices can be silenced by the transceiver and thus collisions can be reduced and avoided among responses from devices. The system performs "area reads" that would not be possible if higher RF frequencies were employed.

DETAILED DESCRIPTION

Figure 1:
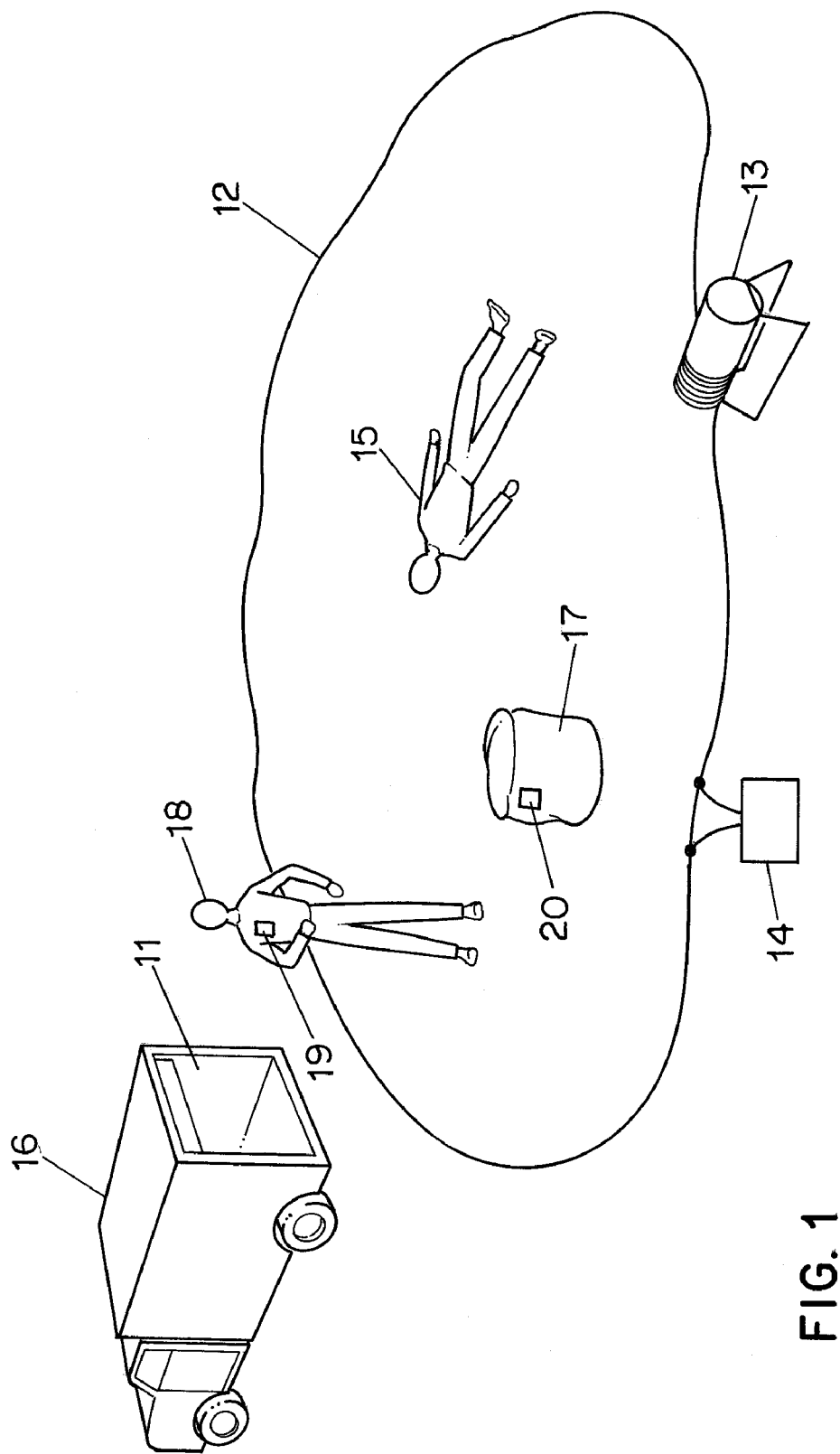
FIG. 1 shows a typical deployment of the system according to the invention.

Turning to FIG. 1, what is shown is a typical deployment of the system according to the invention. A truck or other motor vehicle 16 arrives at a crime scene defined by corpse 15. A spool 13 is removed from the truck and is placed at a position that lies on a desired crime scene boundary. An electrically conductive line 12 is unspooled from the spool 13 and is laid out along the surface of the ground along the desired crime scene boundary, returning to the start to define a complete boundary. The line is connected to a transceiver 14 about which more will be said later. The transceiver 14 is optionally equipped with a GPRS, Edge, EVDO, WiFi, or other WAN interface permitting reporting of events to distant equipment omitted for clarity in FIG. 1.

Personnel 18 wears a badge 19, containing a radio tag. The radio tags employed can, for example, be tags such as those described in U.S. Pat. No. 7,049,963 entitled "Networked RF tag for tracking freight" and assigned to the same assignee as the present invention, which patent is incorporated herein by reference.

The transceiver 14 can, for example, be a transceiver such as that described in copending U.S. application No. 60/806,520, filed Jul. 3, 2006 and assigned to the same assignee as the present invention, which application is incorporated herein by reference. The transceiver can transmit at, say, a predetermined multiple of 32768 Hertz (the standard watch crystal frequency) such as 65 kHz or 133 kHz. The transceiver may have switchable antenna terminals to handle as many as four distinct antennae. The transceiver can switch from one antenna to the next, and even if one antenna is not well coupled with a particular tag, very likely one of the other two antennas will turn out to be well coupled with that particular tag.

The typical steps of deployment, as mentioned above, call for a line at least twenty feet in length. Each tag, whether on an evidence bag or on a badge, has a respective identifier and is disposed to receive queries at a radio frequency no greater than 1 MHz and to emit responses thereto at a radio frequency no greater than 1 MHz. In the case of an evidence bag, there is a tag mechanically affixed to the bag. The bag has an opening and a closure for the opening.

A first responder at the crime scene will define a first scene of interest having a perimeter, the scene of interest having an area, the area exceeding twenty-five square feet, the perimeter extending at least twenty feet. The conductive line is deployed starting with its first end at a first point at the perimeter, along the perimeter around the first scene of interest, and returning with its second end to the first point. A first apparatus (the transceiver 14) is connected a the first and second ends of the line. The apparatus operates at a radio frequency no greater than 1 MHz.

The first apparatus is operated to emit a query. It is operated to listen for a response to the query from a tag. In the event of a response, an identifier is extracted an identifier, and the identifier is stored in the first apparatus and/or is communicated via a WAN link to other equipment. A silence request is transmitted with respect to the identifier.

The emitting, listening, extracting, storing, and transmitting steps, are repeated, thereby accumulating a list of identifiers. The system makes note of times at which the list changes, thereby detecting events of tags and/or badges entering and leaving the first scene of interest.

Later when the crime scene is cleared, the line is removed and respooled. Still later, the spool is redeployed to a second crime scene elsewhere.

The line may be laid upon the ground, or may be suspended from posts or vegetation or otherwise deployed at waist or chest height.

Evidence bags can optionally each have a button that permits the tag to respond differently due to the pressing of the button, in which case in the event of a response that is different due to the pressing of a button, what is stored additionally includes information thereof, thereby detecting events of the pressing of a button on a tag. The button might mean that the bag has been put into use.

The evidence bags may each have a motion sensor which, when triggered, causes the tag to respond differently due to sensed motion, in which case in the event of a response that is different due to sensed motion, what is stored additionally includes information thereof, thereby detecting events of motion of an evidence bag.

The procedure for use of a bag may include such steps as placing a first item in a bag affixed to a first tag; closing the closure of the bag affixed to the first tag; placing a second item in a bag affixed to a second tag; closing the closure of the bag affixed to the second tag; removing the first tag and the second tag, and their respective bags, from the enclosure; and detecting the events of the first and second tags leaving the scene of interest.

Badges may also be used. A badge may have a respective identifier and disposed to receive queries at a radio frequency no greater than 1 MHz and to emit responses thereto at a radio frequency no greater than 1 MHz, in which case the step of making note of times at which the list changes further detects events of badges entering and leaving the first scene of interest.

The evidence bags may optionally each have a sensor sensing a closed condition of the closure, the sensor causing the tag to respond differently due to the closed condition, in which case in the event of a response that is different due to the closed condition, what is stored additionally includes information thereof, thereby detecting events of the closure being opened or closed on the bag of a tag.

The conductive line may comprises a tape bearing printed indicia visible from a distance, for example the words "CRIME SCENE".

It will be appreciated that this system can detect entry and exit of evidence bags and of badges from any direction. There is not a need to enter and exit at a particular point along the boundary.

Those skilled in the art will have no difficulty devising myriad obvious variations and improvements of the invention, all of which are intended to be encompassed within the claims which follow.

The invention claimed is:

1. A method for use with an electrically conductive line and with tags, the line having first and second ends and being at least twenty feet in length, the tags each having a respective identifier and disposed to receive queries at a radio frequency no greater than 1 MHz and to emit responses thereto at a radio frequency no greater than 1 MHz, the tags each mechanically affixed to a respective bag having an opening and a closure for the opening, the method comprising the steps of:

defining a first scene of interest having a perimeter, the scene of interest having an area, the area exceeding twenty-five square feet, the perimeter extending at least twenty feet;

deploying the line starting with its first end at a first point at the perimeter, along the perimeter around the first scene of interest, and returning with its second end to the first point;

connecting the first and second ends to a first apparatus operating at a radio frequency no greater than 1 MHz;

operating said apparatus to emit a query;

operating said apparatus to listen for a response to the query from a tag;

in the event of a response, extracting an identifier from the response, storing the identifier in said apparatus, and transmitting a silence request with respect to the identifier;

repeating the emitting, listening, extracting, storing, and transmitting steps, thereby accumulating a list of identifiers;

recording times at which the list changes, thereby detecting events of tags entering and leaving the first scene of interest;

after the preceding steps, removing the line;

after removing the line, defining a second scene of interest having a perimeter, the second scene of interest having an area, the area exceeding twenty-five square feet, the perimeter extending at least twenty feet;

deploying the line starting with its first end at a first point at the perimeter, along the perimeter around the second scene of interest, and returning with its second end to the first point; and connecting the first and second ends to said first apparatus operating at a radio frequency no greater than 1 MHz.

2. The method of claim 1 wherein the step of deploying the line at the first scene of interest comprises laying the line on the ground along the perimeter.

3. The method of claim 1 wherein each tag has a button which, when pressed, causes the tag to respond differently due to the pressing of the button, the method further characterized in that in the event of a response that is different due to the pressing of a button, what is stored additionally includes information thereof, thereby detecting events of the pressing of a button on a tag.

4. The method of claim 1 wherein each tag has a motion sensor which, when triggered, causes the tag to respond differently due to sensed motion, the method further characterized in that in the event of a response that is different due to sensed motion, what is stored additionally includes information thereof, thereby detecting events of motion of a tag.

5. The method of claim 1 further comprising the step of:

placing a first item in the bag affixed to a first tag;

closing the closure of the bag affixed to the first tag;

placing a second item in the bag affixed to a second tag;

closing the closure of the bag affixed to the second tag;

removing the first tag and the second tag, and their respective bags, from the enclosure; and detecting the events of the first and second tags leaving the scene of interest.

6. The method of claim 1, the method performed with respect to badges, the badges each having a respective identifier and disposed to receive queries at a radio frequency no greater than 1 MHz and to emit responses thereto at a radio frequency no greater than 1 MHz, the method further characterized in that the step of making note of times at which the list changes further detects events of badges entering and leaving the first scene of interest.

7. The method of claim 5, the method performed with respect to badges, the badges each having a respective identifier and disposed to receive queries at a radio frequency no greater than 1 MHz and to emit responses thereto at a radio frequency no greater than 1 MHz, the method further characterized in that the step of making note of times at which the list changes further detects events of badges entering and leaving the first scene of interest.

8. The method of claim 1 wherein the step of deploying the line comprises unspooling the line from a spool.

9. The method of claim 1 wherein each tag has a sensor sensing a closed condition of the closure, the sensor causing the tag to respond differently due to the closed condition, the method further characterized in that in the event of a response that is different due to the closed condition, what is stored additionally includes information thereof, thereby detecting events of the closure being opened or closed on the bag of a tag.

10. The method of claim 1 wherein the line further comprises a tape bearing printed indicia visible from a distance.

11. The method of claim 10 wherein the indicia comprise the words "CRIME SCENE".

* * * * *